United States Patent [19]
Lin

[11] Patent Number: 5,570,623
[45] Date of Patent: Nov. 5, 1996

[54] HEAT-RETAINING COFFEE POT

[76] Inventor: Henry Lin, 2nd Fl., No. 86, Sec. 1, Anho Rd., Taipei, Taiwan

[21] Appl. No.: 568,932

[22] Filed: Dec. 7, 1995

[51] Int. Cl.⁶ ................................................. A47J 31/38
[52] U.S. Cl. ............................................ 99/285; 99/297
[58] Field of Search ........................... 99/285, 286, 287, 99/297; 426/433

[56] References Cited

U.S. PATENT DOCUMENTS

| | | | |
|---|---|---|---|
| 2,951,431 | 9/1960 | Hugentobler | 99/285 |
| 3,715,974 | 2/1973 | Beverett | 99/285 |
| 3,927,608 | 12/1975 | Doyel | 99/287 |
| 5,188,019 | 2/1993 | Vahabpour | 99/285 |

Primary Examiner—Robert W. Jenkins
Attorney, Agent, or Firm—Peterson, Wicks, Nemer & Kamrath, P.A.

[57] ABSTRACT

A heat retaining coffee pot comprises a tubular housing into which a hollow thermal insulating jacket is received with a glass, container received in the thermal insulating jacket. A lid unit is fitted to a top of the tubular housing and comprises an outer cover and an inner cover. A filter unit has a bottom portion, a mediate portion and a top portion, the mediate portion slidably extending through the lid with the bottom portion received in the glass container.

11 Claims, 3 Drawing Sheets

5,570,623

HEAT-RETAINING COFFEE POT

FIELD OF THE INVENTION

This invention relates to a coffee pot, and more particularly, to a heat-retaining coffee pot.

BACKGROUND OF THE INVENTION

One type of coffee pot is known to comprise a metal frame, a glass container being supported by the metal frame, a filter unit which can be moved up and down and a cover connected to the filter unit. However, there are several disadvantages of this design. This type of coffee pot dissipates heat very rapidly and is easily broken.

The present invention provides an improved coffee pot to mitigate and/or obviate the aforementioned problems.

BRIEF SUMMARY OF THE INVENTION

In accordance with the present invention, there is provided a heat-retaining coffee pot. The heat-retaining coffee pot comprises a glass container being received in the housing, a lid unit including an upper cover having a lower circular flange with a hole extending through a central portion thereof and a lower cover receivable in the lower flange and a filter unit being connected to the lid unit and receivable into the glass, whereby the lid unit covers the glass container.

Wherein the filter unit comprises a filter screen having a protrusion with a hole defined in a center thereof and a connecting rod having one end fixedly received in the hole of the protrusion and the opposite end extending through the upper cover and lower cover of the lid unit and then threadedly engaged with a knob handle positioned over the lid unit.

An inner periphery of the housing is covered with the thermal insulation material and is adjacent to the glass container. Beverage which is put into the glass container can remain hot and furthermore, the glass is not easily broken.

These and additional objects, if not set forth specifically herein, will be readily apparent to those skilled in the art from the detailed description provided hereunder, with appropriate reference to the accompanying drawings.

DESCRIPTION OF THE PREFERRED EMBODIMENT

Figure 1:
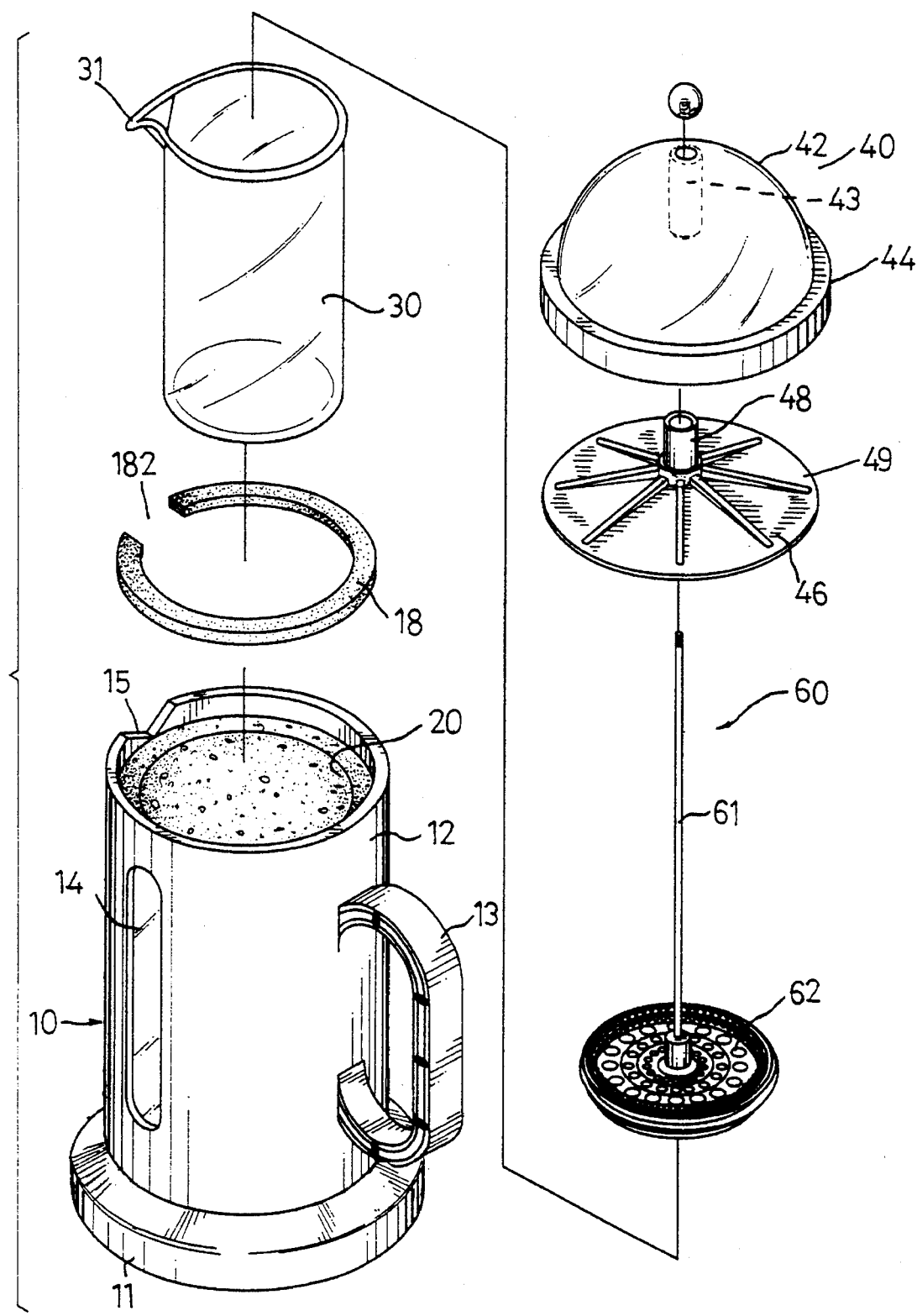
FIG. 1 is a perspective, exploded view of a heat-retaining coffee pot in accordance with the present invention.
Figure 2:
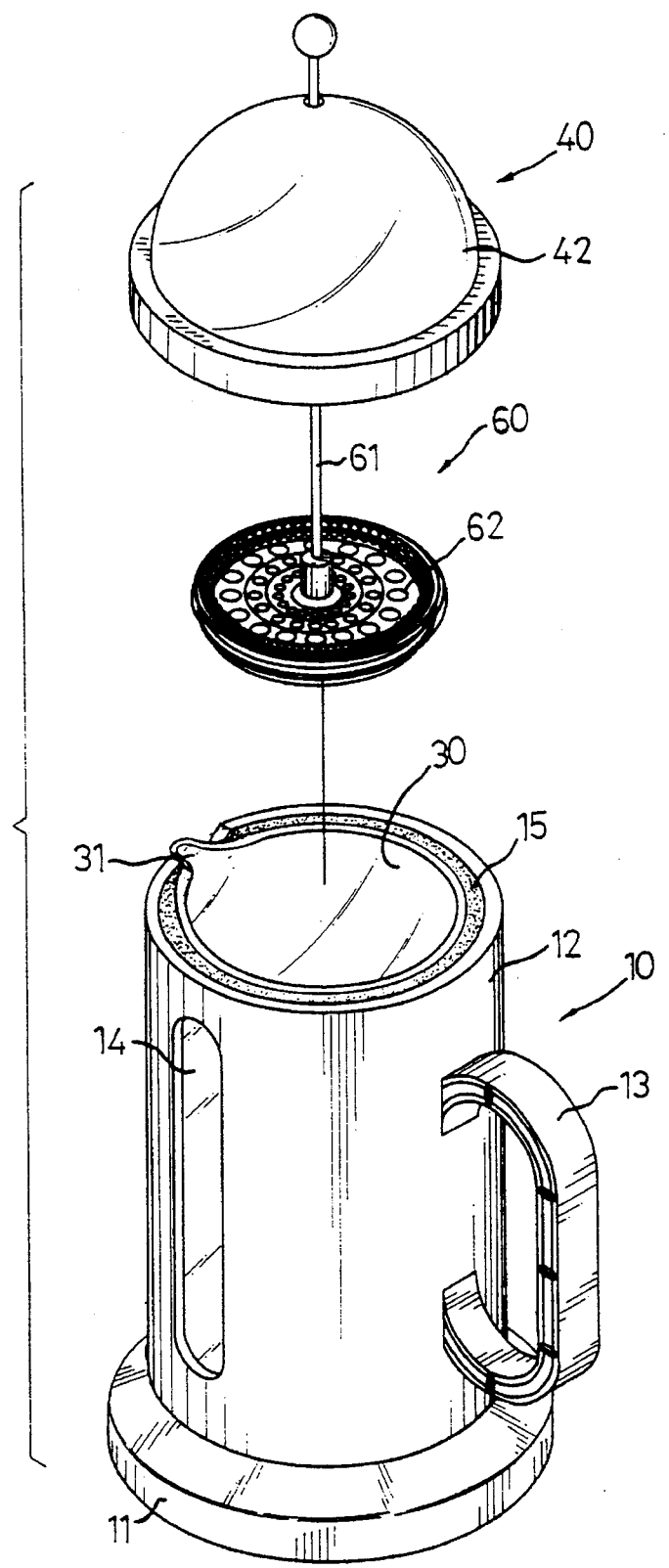
FIG. 2 is a partly assembled view of the heat-retaining coffee pot in accordance with the present.

Referring to the drawings and particularly FIG. 1, a heat-retaining coffee pot comprises a housing 10, a thermal insulating jacket 20, a glass container 30, a lid unit 40, and a filter unit 60.

The housing 10 is tubular and defines an open end, a closed end and a peripheral sidewall 12 extending therebetween, the peripheral sidewall 12 having an inner face and an outer face, and a base 11 , a handle 13 extending outwardly from the outer face of the peripheral sidewall 12 and a longitudinal window 14 defined through the peripheral side wall 12. Preferably, the base 11 integrally extends outwardly and downwardly from the closed end to provide stability for the coffee pot. The window 14 enables a consumer to observe a quantity of beverage in the coffee pot. A notch 15 is further defined in the peripheral sidewall 12 at the open end of the housing 10 and at a position diametrically opposite the handle 13. A thermal insulating jacket 20 is snugly received in the housing 10 extending over the inner face of the peripheral sidewall 12 and the closed end. A slot (not shown) corresponding to the window 14 in the peripheral sidewall is defined in the thermal insulating jacket 20.

Furthermore, the thermal insulating jacket 20 is sized such that when it is inserted into the housing 10, an upper edge thereof aligns with a lowest point of the notch 15 of the housing.

The glass container 30 has a first end, a second end and a periphery extending therebetween, the periphery at the first end defining a spout 31 sized and configured to match the notch 15 of the housing 10. The glass container 30 has an outer diameter which is sized to be snugly received in the thermal insulating jacket 20.

A 'C'-ring 18 with an outer diameter and an inner diameter respectively equal to the outer and inner diameters of the thermal insulating jacket 20 has a height sufficient that when placed on the upper edge of the thermal insulating jacket 20 fitted in the housing 10, a top edge of the 'C'-shaped ring 18 is flush with the open end of the housing 10. A gap 182 defined by two distal tips of the 'C'-shaped ring 18 is sized to receive the spout 31 of the glass container 30.

The lid unit 40 includes an outer cover 42 and an inner cover 46. The outer cover 42 is substantially semispherical with a flange 44 extending outwardly and downwardly at a bottom thereof, and has a tubular boss 43 extending downwardly from an internal upper center thereof. The flange 44 is sized to engage over the open end of the housing 10. The inner cover 46 is a circular plate with a diameter sized to be received within the flange 44 of the outer cover 42 and has a tubular stud 48 extending upwardly from a top face thereof. The tubular boss 43 has a diameter and a length such that a distal tip thereof can be received in the tubular stud 48 when the inner cover 46 is in received in the flange 44 of the outer cover 42. The inner cover 46 further has a series of strengthening ribs 49 on a top face thereof and radiating outward from the tubular stud 48.

The filter unit 60 comprises a filter screen 62 sized to be received in the glass container 30 having a protrusion with a hole defined in a center thereof and a connecting rod 61 having a first end fixedly received in the hole of the protrusion and a second end extending through the tubular stud 48 and tubular boss 43 of the lid unit 40 and then threadedly engaged with a knob positioned over the lid unit 40. Whereby the lid unit 40 together with the filter unit 60 is set on the housing 10.

Figure 3:
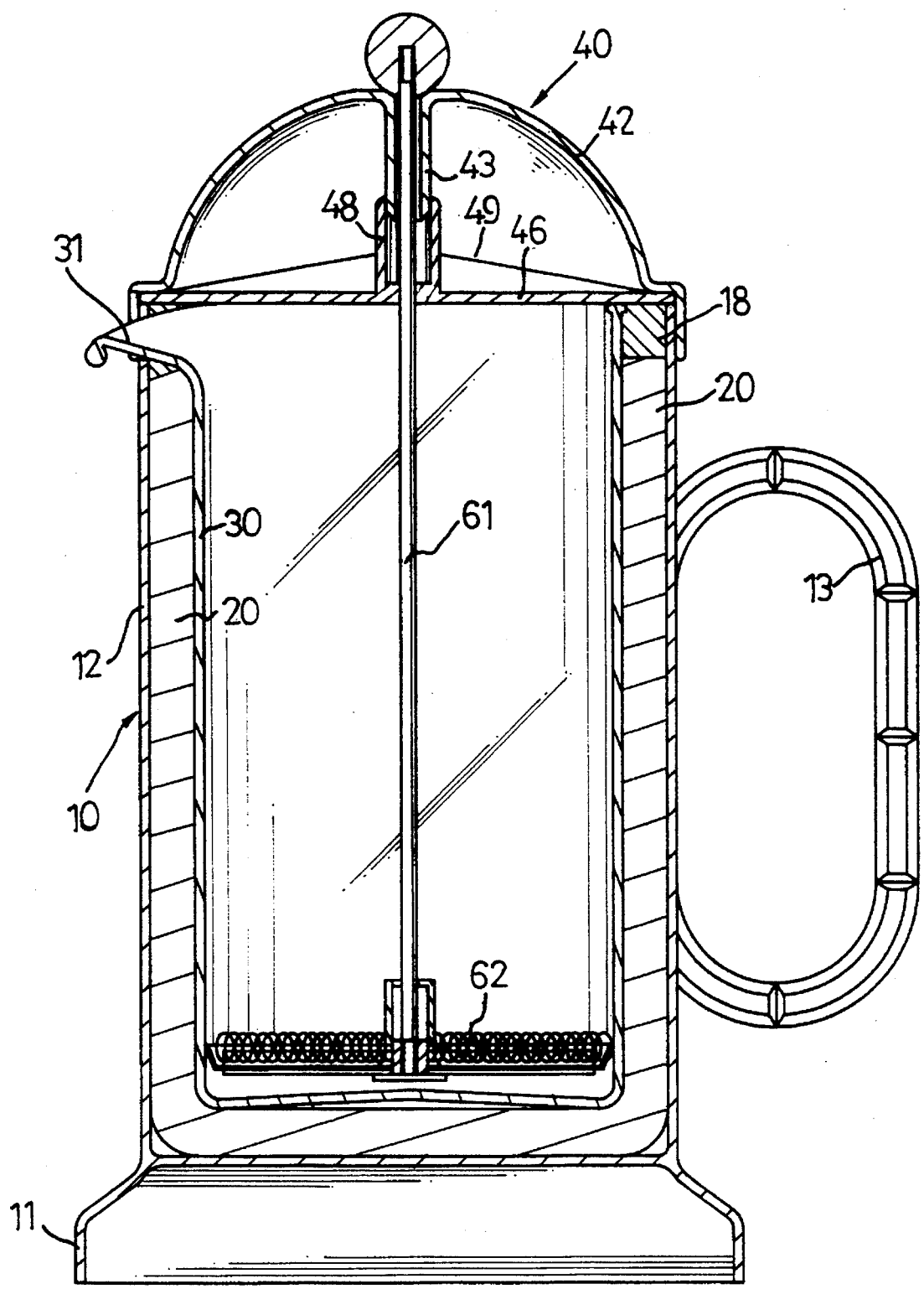
FIG. 3 is a cross-sectional assembled view of the heat-retaining coffee pot in accordance with the present.

After assembly, as shown in FIG. 3, the lid unit 40 covers the housing 10 and the filter unit 60 is inserted into the glass container 30. The filter screen 62 can be moved up and down via pulling and pushing the knob. Due to the thermal insulation material 20 being sandwiched between the housing 10 and the glass container 30, a hot beverage contained in the glass container 30 will remain hot for an extended duration. Furthermore, the thermal insulation material 20 will prevent the glass container 30 from being broken if the coffee maker is dropped and the housing 10 will still further provide security to the glass container 30.

Those skilled in the art will recognize that variations and modifications may be made without departing from the true spirit and scope of the invention. The invention is therefore not to be limited to the illustrations and descriptions set forth but is to be determined by the appended claims.

What the invention claimed is:

1. A heat retaining pot comprising:
    a housing including an open end, a closed end, a peripheral sidewall extending therebetween, the peripheral sidewall including an inner face and an outer face, optical means for observing a beverage level inside the coffee pot and grasping means;
    a heat retention means sized to be received in the housing;
    a container sized to be received in the heat retention means;
    a lid unit sized to engage over the open end of the housing; and
    a filter unit being connected to the lid unit and extending into the container.

2. A heat retaining pot as claimed in claim 1, wherein the optical means is a window defined in the peripheral sidewall.

3. A heat retaining pot as claimed in claim 1 wherein the grasping means is a handle extending from the peripheral sidewall.

4. A heat retaining pot as claimed in claim 1 wherein the housing is made of stainless steel.

5. A heat retaining pot as claimed in claim 1 wherein the container is made of glass.

6. A heat retaining pot as claimed in claim 1 wherein the heat retention means is a tube with an open top, a closed bottom and cylindrical wall extending therebetween.

7. A heat retention pot as claimed in claim 1 wherein the lid unit comprises an outer cover defining a first through hole, an inner cover defining a second through hole whereby the outer cover engages with the inner cover and the first through hole communicates with the second through hole.

8. A heat retaining pot as claimed in claim 1 wherein the filter unit comprises a screen, a rod and a knob.

9. A heat retaining pot as claimed in claim 8 wherein the rod of the filter unit extends through the first and second through holes of the lid unit.

10. A heat retaining pot as claimed in claim 1 further comprising a 'c'-ring received around the container and between the heat retention means and the lid unit.

11. A heat retaining pot as claimed in claim 1 further comprising a base integrally extending outwardly and downwardly from the closed end of the housing.

* * * * *